United States Patent [19]

Hopkins et al.

[11] 4,141,111
[45] * Feb. 27, 1979

[54] ICE SCRAPER

[75] Inventors: Evan L. Hopkins, Emporia, Kans.; Donald W. Cartner, Kansas City, Mo.

[73] Assignee: Hopkins Manufacturing Corporation, Emporia, Kans.

[*] Notice: The portion of the term of this patent subsequent to Aug. 9, 1994, has been disclaimed.

[21] Appl. No.: 808,186

[22] Filed: Jun. 20, 1977

Related U.S. Application Data

[63] Continuation of Ser. No. 687,073, May 17, 1976, Pat. No. 4,040,140.

[51] Int. Cl.² .................... B60S 1/04; A47L 17/06
[52] U.S. Cl. ................................................. 15/236 R
[58] Field of Search ............... 15/105, 111, 236 R, 15/256.51; 30/169; D7/181; 401/261, 266, 139

[56] References Cited

U.S. PATENT DOCUMENTS

| | | | |
|---|---|---|---|
| D. 230,391 | 2/1974 | Dudte | D7/181 |
| 1,442,559 | 1/1923 | Doty | 15/236 R X |
| 2,772,430 | 12/1956 | Moritt | 15/111 X |
| 2,981,964 | 5/1961 | Downing | 15/236 R X |
| 3,193,924 | 7/1965 | Gariepy | 15/236 R X |
| 3,274,684 | 9/1966 | Marks | 15/236 R X |
| 3,787,921 | 1/1974 | Feldmann | 15/236 R X |

FOREIGN PATENT DOCUMENTS 912991  4/1954  Fed. Rep. of Germany ........... 401/266

Primary Examiner—Edward L. Roberts
Attorney, Agent, or Firm—Kenway & Jenney

[57] ABSTRACT

An ice and snow scraper adapted to be held in the hand of a user is disclosed. The scraper comprises a one-piece body having a hand-fitting handle section, a blade section, and an intermediate section. The blade section comprises a scraping surface and an oblique ice-deflecting surface. The intermediate section is curved so as to displace the blade section below the plane of the handle section. This scraper shape facilitates the application of force longitudinally of a surface to be scraped with the hand of the user remaining spaced from that surface while ice is deflected substantially away from the hand of the user and the blade is oriented at the optimum scraping angle.

2 Claims, 4 Drawing Figures

ICE SCRAPER

This is a continuation of application Ser. No. 687,073 filed May 17, 1976, now U.S. Pat. No. 4,040,140.

BACKGROUND OF THE INVENTION

This invention relates to scrapers, and more particularly to an improved, hand-held scraper for removing ice and snow from windshields and the like.

Recently, hand-held ice scrapers made of a flat, single piece of polymeric material such as polymethacrylate have become widely available. These scrapers comprise an elongate body defining top and bottom surfaces spaced about 7 mm apart and defining a wide scraper blade at one end thereof comprising an oblique surface extending from the top surface toward the bottom surface and terminating in a scraping edge. From the blade section, the body tapers inwardly defining opposed converging edges. A pliable, polymeric sheath envelops the end remote from the scraping blade and covers about two-thirds of the linear extent of the ice scraper to serve as a hand grip.

It is a requirement for efficient scraping that such prior art scrapers be held at an angle to the surface to be scraped with the scraping edge in contact therewith, and simultaneously be forced in a direction parallel to the surface. However, the design of these scrapers makes the simultaneous application of the required forces difficult. In addition, the scraper's handle is too wide to enable the user to obtain a good grip, and during use, the user's fingers, gripping the scraper handle, are positioned for undesirable and potentially injurious contact with the ice or windshield. Furthermore, the scraper design and the forces of the scraping action tend to throw ice or snow up onto the hand of the user.

In addition to these manipulation problems, ice scrapers of the type described also suffer from a short useful lifetime, owing to the fragile nature of the scraping edge. In this regard, where the oblique surface and the bottom surface meet, a thin, structurally inadequate scraping edge is defined. During use, the edge becomes chipped, and thereafter, the scraper leaves streaks on the windshield surface.

SUMMARY OF THE INVENTION

According to the present invention, an improved scraper of the unitary type is provided which incorporates structural features to eliminate or greatly diminish the effect of the drawbacks of prior art scrapers. The scraper comprises a one-piece body having top and bottom surfaces. At one end of the body is a scraping blade comprising a scraping edge and a deflecting surface extending obliquely between the scraper's top and bottom surfaces. At the extremity remote from the scraping blade, a handle section is provided having a longitudinal axis and a shape designed to improve the grip that a user can obtain. A curved intermediate section, the bottom surface of which is concave, connects the blade and the handle. The curvature of this intermediate section serves to elevate the handle section above the scraping blade and enables the user to apply force longitudinally of the windshield or other surface to be scraped, while automatically orienting the scraper blade at an optimum angle to the windshield. The body is widest at the scraping blade and narrows continuously toward the end remote therefrom.

With the scraper of the invention, there is much less likelihood that the hand of the user will contact the windshield, and ice is substantially directed away from the hand of the user.

Preferably, the scraping blade is displaced about 16 millimeters from the bottom surface of the handle section and the handle section has lateral edges which incline relative to the longitudinal axis at an angle of convergence less than the angle of convergence of the intermediate section. This construction enables a relatively narrow, hand-fitting handle section to be provided together with a wide blade, without sacrificing the strength of the intermediate section.

In accordance with another aspect of the invention, the scraping blade further comprises a chip-resistant scraping surface which intersects with the oblique, deflecting surface and defines an edge at its intersection with the bottom surface. The scraping surface is oriented such that, when the scraper is used, the scraping surface makes substantially a right angle with the windshield, or is tipped slightly toward the handle portion to define an acute angle, e.g., between about 70° and about 90°, at the intersection of the windshield surface and the scraping surface. Preferably, the angle of intersection between the bottom surface of the body and the scraping surface is between about 50° and about 90°, the angle of intersection between the scraping surface and deflecting surface is between about 130° and about 170°, and the angle of intersection between the deflecting surface and the top surface of the body is between about 120° and about 160°. The depth of the scraping surface is preferably between about 0.2 mm and about 1.2 mm. The provision of the scraping edge, especially when oriented on the scraper as described, not only tends to avoid chipping of the scraping blade, but also improves the efficiency of the scraping action.

Accordingly, objects of the invention include the provision of an inexpensive hand-held scraper which is easier to use and more efficient than the known prior art scrapers, enables the user to apply force in a direction longitudinally of the surface to be scraped while automatically engaging the surface at the proper angle, and throws ice and snow such that its tendency to contact the hand of the user is diminished.

Another object of the invention is to provide a scraper having a hand-fitting grip which is designed such that the fingers of the user do not contact the surface to be scraped. A further object is to provide a scraper having a more efficient, chip-resistant blade.

These and other objects and features of the invention will be apparent to those skilled in the art from the drawing and from the following description of some preferred embodiments.

DESCRIPTION OF PREFERRED EMBODIMENTS

Figure 1:
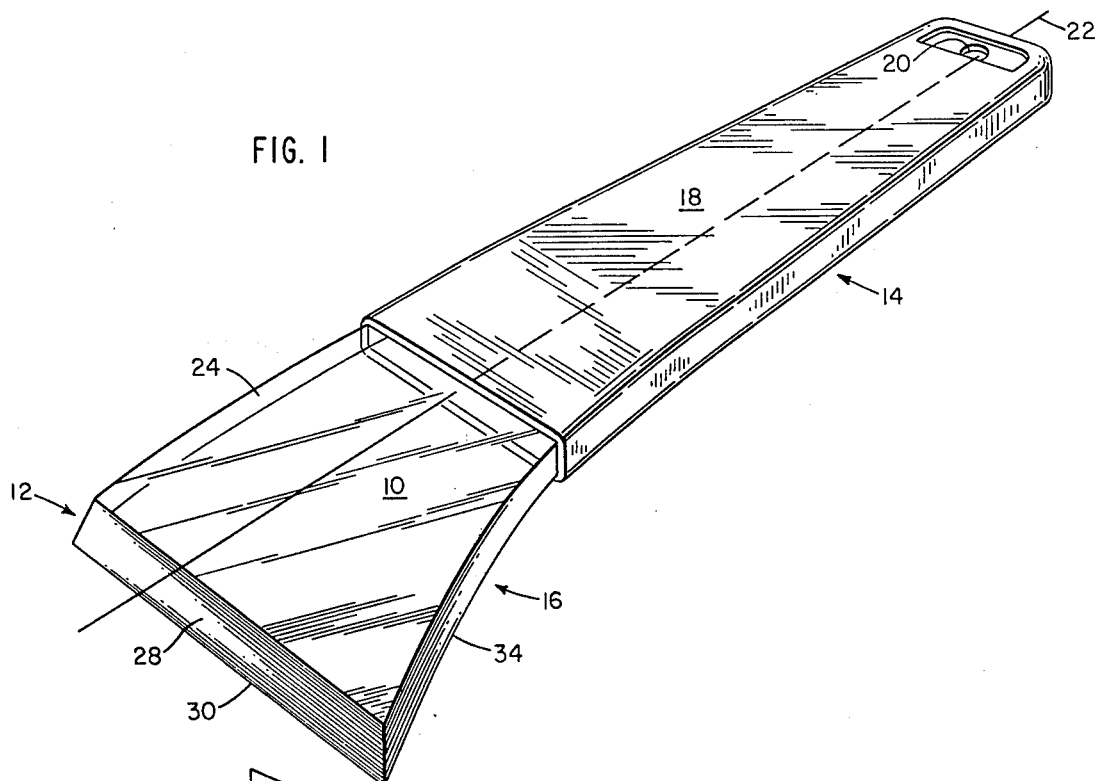
FIG. 1 is a perspective view of an ice scraper embodying the invention.

Referring to the drawing, FIG. 1 shows a first embodiment of the invention which comprises a one-piece, polymethacrylate, molded body 10 having a pair of substantially congruent top and bottom surfaces 24, 26, and defining a scraping blade 12, a handle section 14, and an intermediate section 16 extending therebetween. A polyvinyl chloride hand-grip 18 envelops the handle section 14 and may define a hole 20, useful for storing the scraper on a hanger.

As shown in FIG. 1, the scraping blade 12 comprises a deflecting surface 28 which extends obliquely from the top surface 24 to the bottom surface 26 and terminates in a scraping edge 30.

Figure 2:
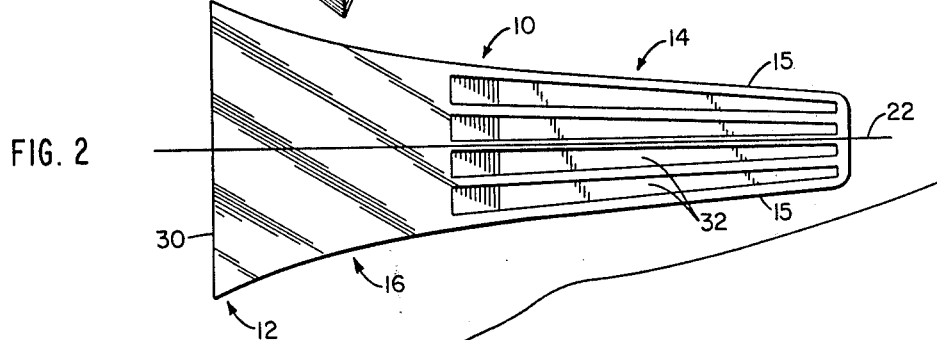
FIG. 2 is a bottom plan view of the scraper of FIG. 1.

As shown in FIG. 2, the handle section 14 has a longitudinal axis 22 and may incorporate a series of grooves 32. The provision of the grooves conserves material by removing it from a place where it is not needed for structural strength, and facilitates mounting and removal of the hand-grip 18 by providing an anti-suction effect.

As also shown in FIG. 2, the scraper of the invention is widest at the scraping blade 12 and arcuately tapers inwardly and backwardly toward the handle section 14 at intermediate section 16. The lateral edges 15 of the handle section 14 are inclined relative to the axis 22 at an angle of convergence less than the angle of convergence of intermediate section 16. This construction enables the provision of a wide blade together with a hand-fitting handle without sacrificing the strength of the intermediate portion. Of course, the edges of intermediate section 16 could be tapered rectilinearly, but at a greater angle than the edges of handle portion 14, to provide the same effect.

Figure 3:
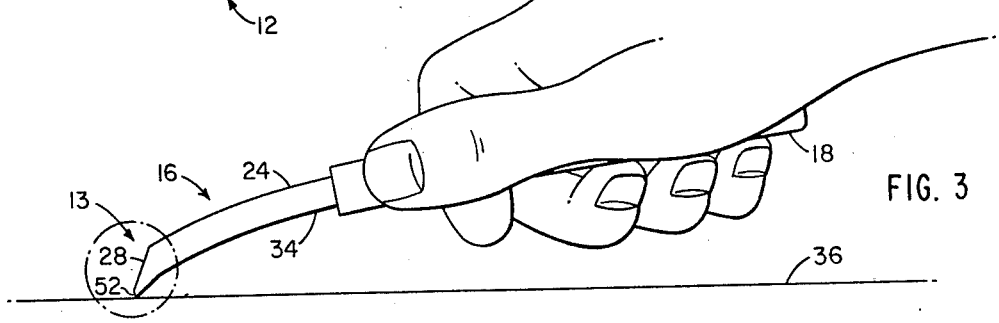
FIG. 3 is a side plan view of an embodiment of the scraper in use.

As can be seen from FIGS. 1 and 3, the intermediate section 16 is curved to define a concave portion 34 of the bottom surface 26. This enables the user to grip hand-grip 18 and to apply a scraping force longitudinally of the surface to be scraped 36, e.g., a windshield, yet the fingers on the hand of the user do not contact the windshield surface and the blade 12 is in an ideal orientation relative to surface 36 for scraping ice. Further, the curvature of the top surface of intermediate portion 16, in combination with deflecting surface 28, serves to throw ice being scraped in a direction resulting in significantly less ice coming into contact with the hand of the user, i.e., tends to direct ice in the scraping direction. Preferably, the scraping edge 30 is displaced between about 12 mm and 20 mm, optimally about 16 mm, from the bottom surface 26 of handle section 14.

Figure 4:
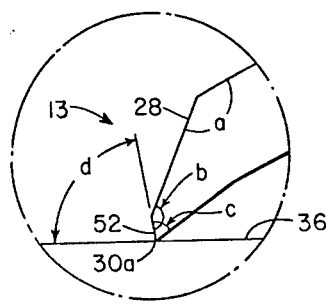
FIG. 4 is a fragmentary detailed view of the scraping blade of the embodiment shown in FIG. 3.

FIG. 3, in addition to illustrating the orientation of the scraper of the invention with respect to surface 36, also illustrates a second embodiment of the scraper blade, indicated at 13, which can be seen in greater detail in FIG. 4. In this embodiment of the blade, a scraping surface 52 is provided which intersects with the oblique deflecting surface 28 and which defines an edge 30a where it intersects the bottom surface 26. The scraping surface 52 and the bottom surface 26 intersect at an angle (c) between about 50° and 90°; the scraping surface and deflection surface 28 intersect at an angle (b) between about 130° an 170°; and the deflecting surface and top surface 24 intersect at an angle (a) between about 120° and 160°. The vertical dimension of scraping surface 52 is between about 0.2 mm and 1.2 mm, preferably about 0.7 mm. The provision of surface 52 has been found to increase the efficiency of ice removal and further to resist chipping such as sometimes occurs at a conventional scraping edge. As indicated by angle (d) of FIG. 4, when the scraper is in use, scraping edge 52 is oriented at a right angle to surface 36, or tipped backwardly toward the handle section 14 to define an acute angle of intersection with the scraping surface. Thus, angle (d) will be no greater than about 90°. FIG. 4 also shows that, when the scrape is in use, deflecting surface 28 is oblique relative to the surface 36.

As will be obvious to those skilled in the art, a scraping surface of the type described may be provided by simply removing a triangular cross-sectional piece of material from an otherwise conventional scraping edge, or preferably, may be added as additional material molded to the bottom surface of the scraper as illustrated in FIG. 4.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A scraper for removing ice from a surface to be scraped, said scraper comprising a body having top and bottom surfaces, said body defining:
    a scraping blade at one end thereof comprising
        a deflecting surface extending obliquely from said top surface toward said bottom surface, and
        a scraping edge;
    a handle section remote from said one end located at the extremity of the body of said scraper, said handle section having a longitudinal axis; and
    an intermediate section curved to define
        a convex portion of said top surface extending between said blade and said handle section, projecting below said axis, and being substantially free of obstructions to the removal of ice therefrom, and
        a concave portion of said bottom surface extending between said blade and handle section below said axis;
    said scraper being operable during scraping to permit force to be applied longitudinally of a surface to be scraped with the hand of the user, when gripping said handle section, remaining substantially spaced from the surface to be scraped,
        with ice thrown by the deflecting action of said deflecting surface and said convex portion of said top surface being substantially deflected away from said hand of said user, and
        with said deflecting surface being oblique relative to said surface to be scraped,
    said handle section, on lateral edges thereof, providing a generally wedge shaped handle configuration operable to progressively resist pushing force imposed on said handle section and directed toward said scraping blade; and
    said handle section being grippable on the underside thereof adjacent a free end of said handle section.

2. The scraper as set forth in claim 1 wherein said convex portion of said top surface is progressively more steeply inclined away from said longitudinal axis of said handle section and is operable to provide the greatest resistance to movement of ice over the top surface of said scraper adjacent said scraping edge.

* * * * *